United States Patent [19]

Joines

[11] 4,057,093

[45] Nov. 8, 1977

[54] PROTECTIVE APPARATUS FOR MOUNTING TIRES

[76] Inventor: John S. Joines, Rte. 3, Greer, S.C. 29651

[21] Appl. No.: 766,887

[22] Filed: Feb. 9, 1977

[51] Int. Cl.$^2$ .................................. B60C 25/00
[52] U.S. Cl. ............................................. 157/1
[58] Field of Search ......................... 157/1, 1.1

[56] References Cited

U.S. PATENT DOCUMENTS

| | | | |
|---|---|---|---|
| 2,710,054 | 6/1955 | Merriman | 157/1 |
| 2,792,056 | 5/1957 | Ricketts et al. | 157/1 |
| 3,495,647 | 2/1970 | Branick | 157/1 |

*Primary Examiner*—James L. Jones, Jr.
*Assistant Examiner*—James G. Smith
*Attorney, Agent, or Firm*—Bailey, Dority & Flint

[57] ABSTRACT

A safety and protective apparatus for changing and inflating tires mounted on a multi-piece rim assembly includes a base having an upstanding support, an arm pivotably carried on the support pivotable away from the base for positioning the tire and rim thereon and pivotable over the base to a superposed position directly above the tire and rim in a locked position. Spaced fingers depend downwardly from the pivoted arm to engage the rim and prevent escapement and flying apart during tire inflation. A lock assembly is carried by the base for locking the free end of the pivoted arm in a hold-down position.

10 Claims, 2 Drawing Figures

PROTECTIVE APPARATUS FOR MOUNTING TIRES

This invention relates to a protective apparatus, and more particularly to an apparatus which prevents a split rim from flying apart when changing and inflating a tire carried thereon.

Tires utilized on large vehicles such as trucks and tractors are generally mounted on two or three piece rim assemblies. In changing and inflating these tires, extreme caution must be taken to insure that the rim assemblies are properly seated, or it is possible that they will fly apart. In the past, repairmen not only have been seriously injured by the rims flying apart during inflation, but some have been killed. Many attempts have been made to minimize this hazard, but presently there is no fool-proof device now on the market which avoids this hazard. Cages have been constructed into which the tires and rim assemblies can be placed during inflation so that if the rim flies apart, it will be confined to the cage. Such is not a practical solution in that there are many situations where tires have to be repaired in the field, on the highway, and on construction jobs.

A safety device which can be permanently mounted in a repair shop which minimizes lock ring escapement during tire inflation, is disclosed in U.S. Pat. No. 3,559,715. This device utilizes a plurality of pivotal jaw members which extend over the rim during inflation. A spreader bar is provided for maintaining the jaw members in the extended position. One apparent problem with such device is that the spreader bar must be properly positioned or it is possible for the pivotal arms to retract. Furthermore, the device does not lend itself to ready adaptation for use with a plurality of rim and tire sizes.

Accordingly, it is an important object of the present invention to provide a highly reliable safety and protective apparatus for changing tires mounted on multi-piece rims which prevents the rim pieces from flying apart during tire inflation.

Another important object of the present invention is to provide a safety apparatus for changing and inflating tires on multi-piece rims which is easily portable and may be used equally as well in the shop or in the field on a variety of tire and rim sizes.

Still another important object of the present invention is to provide a safety apparatus for mounting tires on multi-piece rims which may be easily and reliably operated by the average tire mechanic.

Yet another important object of the present invention is the provision of safety apparatus for mounting tires on multi-piece rims having a reduced number of parts which might fail increasing the reliability of the device while reducing the cost thereof making it readily affordable for anyone engaged in tire servicing.

BRIEF DESCRIPTION OF THE DRAWING

The construction designed to carry out the invention will be hereinafter described, together with other features thereof.

The invention will be more readily understood from a reading of the following specification, and by reference to the accompanying drawings forming a part thereof, wherein an example of the invention is shown and wherein.

DESCRIPTION OF A PREFERRED EMBODIMENT

The invention relates to a safety and protective apparatus for use in mounting a tire on a multi-piece rim assembly which prevents the rim assembly from flying apart during inflation of the tire. As illustrated, the safety apparatus includes a base member A having an upstanding support member B mounted thereon. An arm member C is pivotably carried on the upstanding support B so as to be pivotable away from the base member to permit placement of the tire and rim assembly thereon and subsequently pivotable over the base to a superposed position directly above the tire and rim. An engagement means carried by the arm member C engages the rim at circumferentially spaced points to prevent escapement and flying apart thereof during inflation of the tire. A releaseable lock means D is carried adjacent the free end of the arm member for maintaining the arm member in a hold-down position when superposed over the tire and rim.

Figure 1:
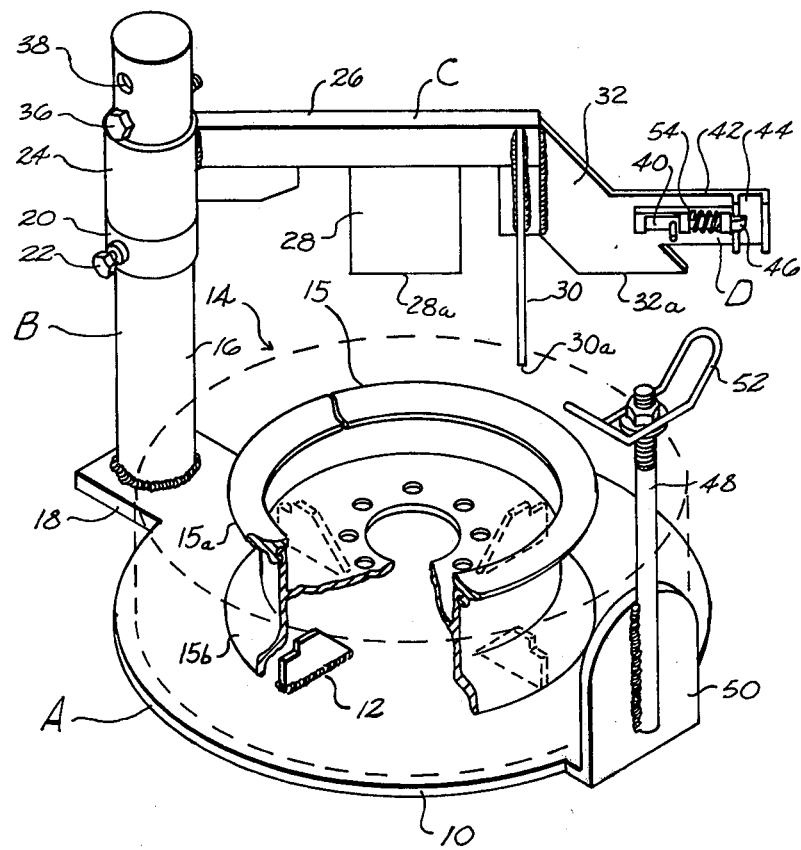
FIG. 1 is a perspective view illustrating a safety apparatus constructed in accordance with the present invention for mounting tires on multi-piece rims.
Figure 2:
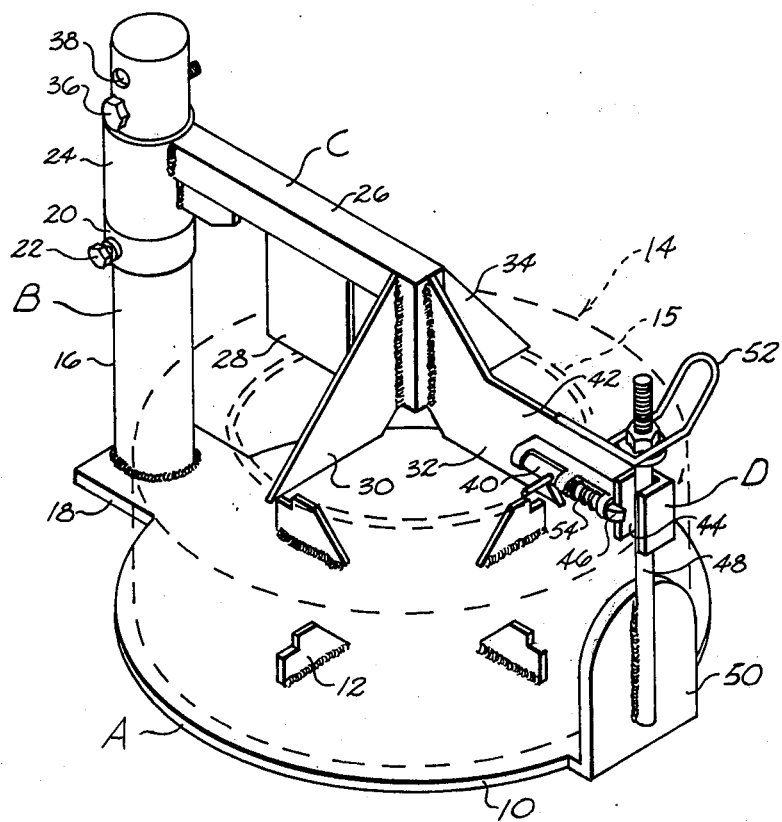
FIG. 2 is a perspective view illustrating the safety apparatus of FIG. 1 with the hold down arm locked in an operational position.

Referring now in more detail to FIGS. 1 and 2, the base member A is illustrated as including a circular base plate 10 having a plurality of cleats 12 for centrally positioning a tire and rim assembly, shown generally at 14, thereon. A two-piece rim 15 is illustrated in FIG. 1 and schematically in dashed lines in FIG. 2 as including a lock rim 15a and a bottom rim piece 15b interlocking therewith. The upstanding support B includes a hollow cylindrical post 16 which is mounted on an extended portion 18 of the base plate 10 such as by welding.

A fixed collar member 20 is received over the cylindrical post 16 and may be adjusted in its vertical position along the length of the post by loosening and tightening a set screw 22.

A sleeve member 24 is received over the cylindrical post 16 so as to rotate thereon as it rests freely on the top of collar member 20. The pivoted arm member C includes an elongated arm 26 affixed to the rotating sleeve 24 in any suitable manner such as by welding. An engagement means is provided for engaging the periphery of a multi-piece rim assembly 15 and in the illustrated embodiment includes a plurality of fingers 28, 30, 32 and 34 depending downwardly from the arm 26 to engage the rim preventing separation and/or the escapement and flying apart thereof. The engagement fingers include radially extending engagement surfaces 28a, 30a, 32a, and 34a which will contact the rim 15 at circumferentially spaced points for a variety of rim diameters and sizes. Access is provided between fingers for physical and visual inspection of the seating of rim pieces 15a and 15b prior and during inflation of the tire mounted thereon. As will be noted, the arm member C will be adjusted in its vertical position along the height of upstanding support B by adjusting the position of collar member 20 with the set screw 22.

Locking means are provided for maintaining the arm member C in a superposed position directly above the rim 15. As illustrated, the locking means includes an abutment member 36 which abuts the sleeve 24 and prevents the upward movement thereof and the locking assembly D carried adjacent the free end of the arm member C. The abutment member 36 may be in the form of bolt member inserted through an opening such as 38 formed in the cylindrical post and secured therein by a nut member. A plurality of openings 38 are provided along the height of the post 16 so that the abutment member may be adjusted to be maintained directly above the sleeve 24 as its position is adjusted. The locking assembly D includes a latching assembly in the form of a spring loaded latch bolt 40 carried on a latch arm 42 extending horizontally from the finger member 32. The latch arm includes a vertical channel 44 and the latch bolt 40 includes a cam surface 46 which permits a complimentary locking member 48 to be received in the channel 44 when the arm member C is swung to the superposed position. Complimentary locking member 48 is preferably an upright threaded rod mounted on a vertical tab portion 50 of the base plate. The upright member 48 includes a nut member 52 in the form of a conventional wingnut which may be rotated to adjacent the top surface of the latch arm 42 to provide an abutment for the top of the channel 44 preventing its upward movement. Therefore, the arm member C is confined in its upward movement on both ends thereof by the abutment member 36 and the nut member 52 when in the superposed position above the rim and tire assembly 14.

In operation, with the pivoted arm member C mounted at the desired vertical position on post member 16, the arm member C is pivoted away from the base plate 10 to permit the positioning of the tire and rim assembly 14 thereon. The arm member C is then pivoted to the superposed position directly over the tire and rim assembly with the engagement fingers 28 through 34 slightly out of contact with the periphery of the rim 15 but directly thereover. In this position, the upright locking member 48 will be received in the channel 44 with the nut member 52 over the top thereof. The latch bolt 44 will have been forced to the left by cam member 46 engaging the upright member 48 and subsequently returned by spring 54 to a position preventing the arm member 26 from pivoting away from the base member 10. In this manner, the horizontal pivotal position of the arm member C is maintained at all times when locked in the superposed position. Thus, the arm member C is locked in a vertical position by the abutment members 36 and 52 on opposing ends thereof and in its horizontal position by the latch bolt 44. During inflation, the lock rim 15a can be easily inspected for proper seating with bottom rim 15b owing to visual and physical access betwen adjacent engagement fingers. If the multi-piece rim assembly 15 should be blown apart during inflation of the tire, the rim will be prevented from escaping the apparatus by the engagement by fingers 28 through 34 superposed in a locked position thereover.

Thus, it can be seen that an advantageous construction can be had for a safety and protective apparatus for use in mounting a tire on a multi-piece rim assembly. The safety apparatus is lightweight making it usable just as well in the field as in the shop. The apparatus relies on very few mechanical moving parts and affords a high degree of reliability in being of simple operation and less susceptible to human error in the use thereof. The device may be inexpensively constructed and readily affordable by anyone involved in the servicing of large truck and tractor tires.

While a preferred embodiment of the invention has been described using specific terms, such description is for illustrative purposes only, and it is to be understood that changes and variations may be made without departing from the spirit or scope of the following claims.

What is claimed is:

1. A safety and protective apparatus for use in mounting a tire on a multi-piece rim assembly to prevent rim escapement during inflation of said tire comprising:
    a base member;
    an arm member;
    support means for pivotably mounting said arm member on said base member;
    said arm member being movable away from said base member permitting placement of said tire and rim thereon and movable over said base member to a superposed position directly above said tire and rim;
    engagement means carried by said arm for engaging said rim crcumferentially to prevent escapement and flying apart thereof during inflation of the tire; and
    means for locking said arm member in said superposed position.

2. The apparatus as set forth in claim 1 wherein said support means includes an upstanding support carried by said base member on which said arm member is pivotably carried.

3. The apparatus set forth in claim 2 wherein said arm member is pivotable about said upstanding support in a substantially horizontal plane.

4. The apparatus set forth in claim 2 wherein said support means includes a vertically adjustable sleeve rotatably carried on said upstanding support with said arm member being carried by said sleeve.

5. The apparatus set forth in claim 4 wherein said locking means includes a vertically adjustable abutment member carried on said upstanding support above said sleeve preventing removal thereof in an upward direction.

6. The apparatus set forth in claim 1 wherein said engagement means includes a plurality of finger elements depending downwardly from said arm member to engage said rim at circumferentially spaced points while providing access therebetween for rim seating inspection.

7. The apparatus set forth in claim 1 wherein said locking means includes a locking assembly carried adjacent a free end of said arm member for maintaining said arm member in a hold-down position when superposed over said tire and rim.

8. The apparatus set forth in claim 7 wherein said locking assembly includes a locking member carried by said base diametrically opposite said support means and a releasable latch member carried adjacent said free end of said arm member for engaging said locking member to form a lock therebetween.

9. A safety and protective apparatus for use in mounting a tire on a multi-piece rim assembly to prevent rim escapement during inflation of said tire comprising:
    a base member;
    an upstanding support mounted on said base member;
    an arm member pivotably carried by said upstanding support;
    said arm member being pivotable away from said base member to permit placement of said tire and rim assembly on said base member and pivotable over said base to a superposed position directly above said tire and rim;
    engagement means carried by said arm member for engaging said rim at circumferentially spaced points to prevent escapement and flying apart thereof during inflation of the tire; and releasable lock means carried by said base member for locking the free end of said arm member in a hold-down position when said arm member is in said superposed position.

10. The apparatus set forth in claim 9 including a sleeve rotatably carried on said upstanding support, means for vertically adjusting the position of said sleeve along the length of said upstanding support, and said arm member being affixed to said sleeve for rotation therewith.

* * * * *